United States Patent
Lin et al.

(10) Patent No.: US 7,930,532 B2
(45) Date of Patent: Apr. 19, 2011

(54) SYSTEMS AND METHODS FOR BASIC INPUT OUTPUT SYSTEM (BIOS) MANAGEMENT

(75) Inventors: Hao-Lin Lin, Taipei (TW); Hsiao-Fung Chou, Taipei (TW)

(73) Assignee: Via Technologies, Inc., Hsin-Tien (TW)

( * ) Notice: Subject to any disclaimer, the term of this patent is extended or adjusted under 35 U.S.C. 154(b) by 862 days.

(21) Appl. No.: 11/861,335

(22) Filed: Sep. 26, 2007

(65) Prior Publication Data
US 2008/0114977 A1    May 15, 2008

Related U.S. Application Data

(60) Provisional application No. 60/865,851, filed on Nov. 15, 2006.

(51) Int. Cl.
*G06F 9/00* (2006.01)
*G06F 15/177* (2006.01)

(52) U.S. Cl. .................. 713/2; 713/1; 713/100
(58) Field of Classification Search .................. 713/1, 2, 713/100
See application file for complete search history.

(56) References Cited

U.S. PATENT DOCUMENTS

| 5,088,023 | A  | * | 2/1992 | Nakamura et al. | 711/103 |
| 7,024,551 | B2 | * | 4/2006 | King et al. | 713/2 |
| 2004/0133771 | A1 | * | 7/2004 | King et al. | 713/100 |
| 2006/0020837 | A1 | * | 1/2006 | Rothman et al. | 713/310 |
| 2006/0041703 | A1 | * | 2/2006 | Tseng | 710/306 |
| 2007/0168737 | A1 | * | 7/2007 | Lee et al. | 714/36 |
| 2007/0288737 | A1 | * | 12/2007 | Boyle | 713/1 |
| 2008/0098380 | A1 | * | 4/2008 | Klusmeyer | 717/168 |

FOREIGN PATENT DOCUMENTS

| TW | 594563 | 6/2004 |
| TW | 200619967 | 6/2006 |

OTHER PUBLICATIONS

Taiwanese language office action dated Aug. 16, 2010.
English language translation of abstract of TW 594563 (published Jun. 21, 2004).
English language translation of abstract of TW 200619967 (published Jun. 16, 2006).
SPI Interface Specification; VTI Technologies; Sep. 19, 2005; pp. 1-5.

* cited by examiner

*Primary Examiner* — Thomas Lee
*Assistant Examiner* — Jaweed A Abbaszadeh
(74) *Attorney, Agent, or Firm* — Thomas | Kayden (57) ABSTRACT

An embodiment of a computer system comprises a south-bridge. The south-bridge comprises a controller including a buffer for communicating with electronic devices. When detecting that a Reset# signal is asserted, the buffer is set to a Hi-Impedance state to separate the controller from the electronic device. The Reset# signal indicates a full system reset.

17 Claims, 8 Drawing Sheets

SYSTEMS AND METHODS FOR BASIC INPUT OUTPUT SYSTEM (BIOS) MANAGEMENT

This application claims the full benefit and priority of provisional U.S. Patent Application Ser. No. 60/865,851, filed Nov. 15, 2006, entitled "METHODS FOR IMPROVING SPI (SERIAL PERIPHERAL INTERFACE) CONTROLLER WITH LOW COST", and incorporates the entire contents of said application herein.

BACKGROUND

The invention relates to a basic input output system (BIOS), and more particularly, to systems and methods for BIOS management.

In order to reduce hardware cost, chipset size or the number of pins provided by the chipset is reduced. A south-bridge may connect to a flash read-only memory (ROM) storing BIOS via the industry standard architecture (ISA) interface, low pin count (LPC) interface, or even the serial peripheral interface (SPI), and retrieve the BIOS therefrom. The advantage of the SPI is that it minimizes the number of conductors, pins, and the size of the package of an integrated circuit, resulting in reduced fabrication, assembly and testing costs. Thus, the SPI interface is increasingly being integrated into south-bridge chips provided by many chipset manufacturers.

SUMMARY

Computer systems are provided. An embodiment of a computer system comprises a south-bridge. The south-bridge comprises a controller including a buffer for communicating with electronic devices. When detecting that a Reset# signal is asserted, the buffer is set to a Hi-Impedance state to separate the controller from the electronic device. The Reset# signal indicates a full system reset.

An embodiment of a computer system comprises a motherboard. The motherboard comprises the described south-bridge.

Methods for basic input output system (BIOS) management are provided. An embodiment of a method for BIOS management, performed by a determination module of a south-bridge, comprises the following steps. A memory cycle indicating required BIOS code is to be fetched is received from a central processing unit (CPU). The received memory cycle is transferred to a peripheral component interconnect (PCI) card. An acknowledgement signal is received from the PCI card. BIOS code is received from the PCI card after receiving the acknowledgement signal from the PCI card. The determination module responds to the CPU with the received BIOS code.

An embodiment of a method for BIOS management, performed by a peripheral component interconnect (PCI) card comprising a switching device, comprises the following steps. A signal indicating that the switching device thereof is switched to an "ON" state is received. A Reset# signal is asserted to a south-bridge. A BIOS in a non-volatile memory is programmed after assertion of the Reset# signal. The Reset# signal indicates a full system reset.

BRIEF DESCRIPTION OF DRAWINGS

The invention will become more fully understood by referring to the following detailed description with reference to the accompanying drawings, wherein.

DETAILED DESCRIPTION

Figure 1:
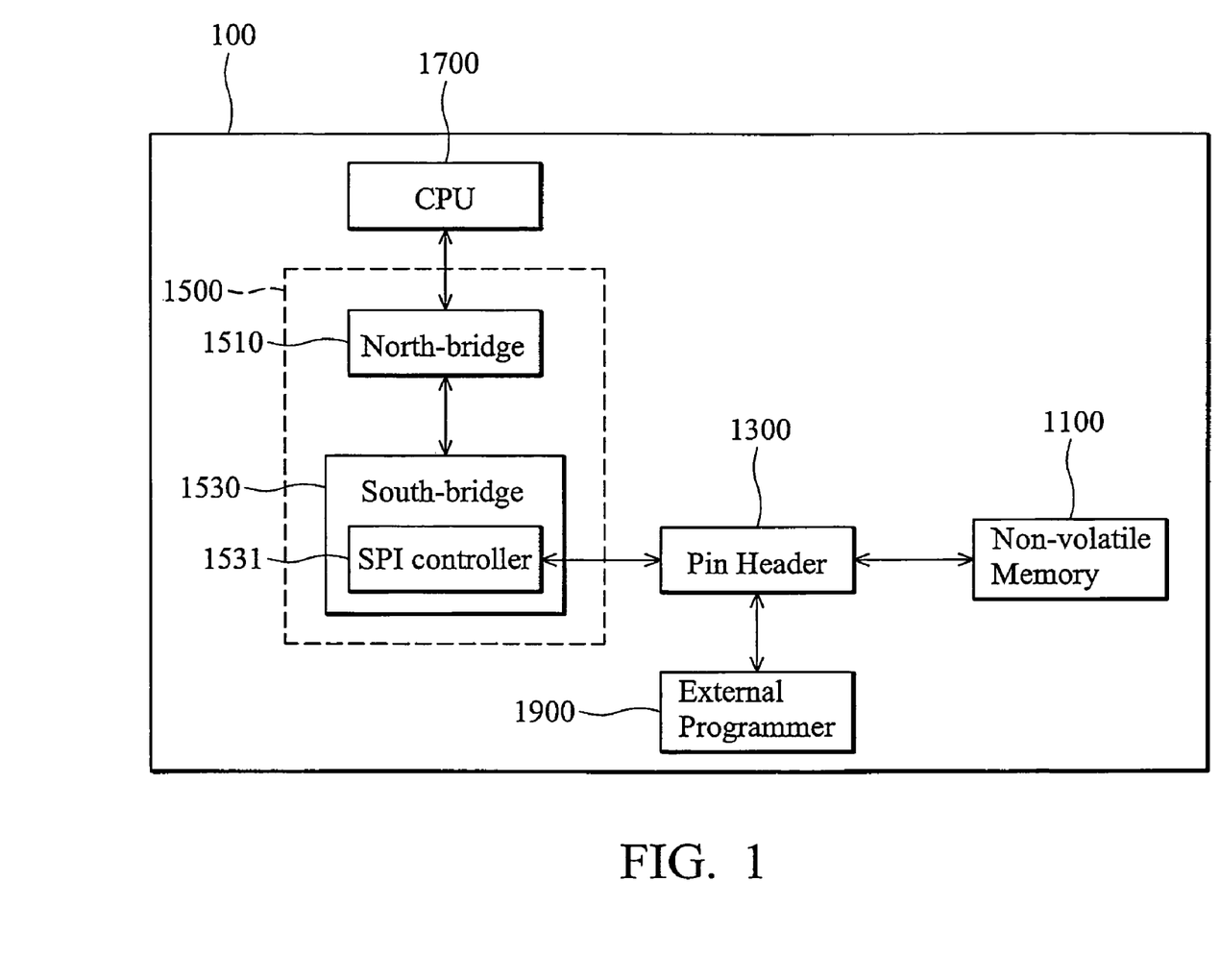
FIG. 1 is a diagram of a hardware environment of an embodiment of a system for basic input output system (BIOS) management.

FIG. 1 is a diagram of a hardware environment of an embodiment of a system for basic input output system (BIOS) management 100 comprising a non-volatile memory 1100, such as flash read only memory (ROM), a pin header 1300, a chipset 1500, a central processing unit (CPU) 1700, and an external programmer 1900. The non-volatile memory 1100, pin header 1300, chipset 1500, and central processing unit (CPU) 1700 are typically installed on a motherboard. The chipset 1500 typically comprises a north-bridge 1510 and a south-bridge 1530. The north-bridge 1510, a controller, typically handles communications between the CPU 1700, memory (not shown), AGP (accelerated graphics port, not shown) or PCI express (not shown), and the south-bridge 1530. The south-bridge 1530 connects to the non-volatile memory 1100 by serial peripheral interface (SPI) Bus. The non-volatile memory 1100 stores BIOS comprising a set of routines enabling a computer to start an operating system (OS) and to communicate with various devices, such as disk drives, keyboard, monitor, printer, and communications ports. The south-bridge 1530 comprises an SPI controller 1531 for communicating with the nonvolatile memory 1100. The external programmer 1900 may connect to the pin header 1300, and refresh (i.e. program) the stored BIOS in the non-volatile memory 1100.

Figure 2:
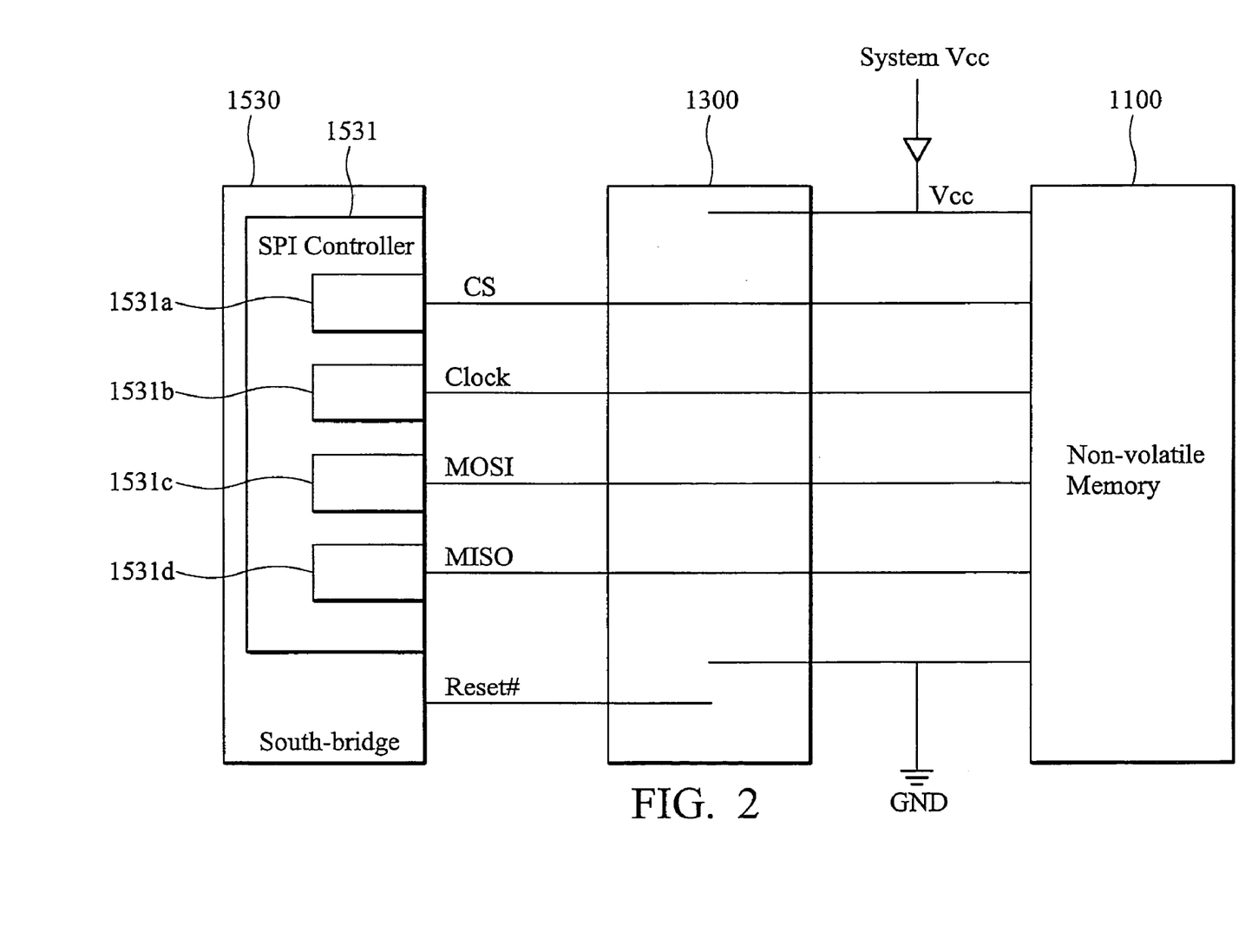
FIG. 2 is a diagram of the architecture of a south-bridge, a pin header, and a non-volatile memory.

FIG. 2 is a diagram of the architecture of the south-bridge 1530, pin header 1300, and non-volatile memory 1100. The SPI controller 1531 controls various digital electronics, such as the non-volatile memory 1100, by accepting a clocked serial stream of bits. In operation, SPI signals, such as chip select (CS), clock, master output slave input (MOSI), and master input slave output (MISO) signals, are respectively transmitted between four buffers 1531a to 1531d (respectively being an input or output buffer) of the SPI controller 1531 and the non-volatile memory 1100. The SPI controller 1531 operates in full duplex mode (i.e. the controller simultaneously sends and receives data). Data is typically transferred into the non-volatile memory 1100 when a clock is in rising edge, and is transferred out when the clock is in falling edge. The pin header 1300 is connected between the south-bridge 1530 and the non-volatile memory 1100. Whenever the full system is powered or not, an external electronic device, such as the external programmer 1900, can retrieve data from the non-volatile memory 1100, or program the BIOS in the non-volatile memory 1100 with the SPI signals when plugging in the pin header 1300. Because the full system is powered, a conductive line is connected between the south-bridge 1530 and the pin header 1300, thus, the external electronic device can assert and de-assert a Reset# signal to the south-bridge 1530. The asserted Reset# signal asserted indicates a full system reset.

Figure 3:
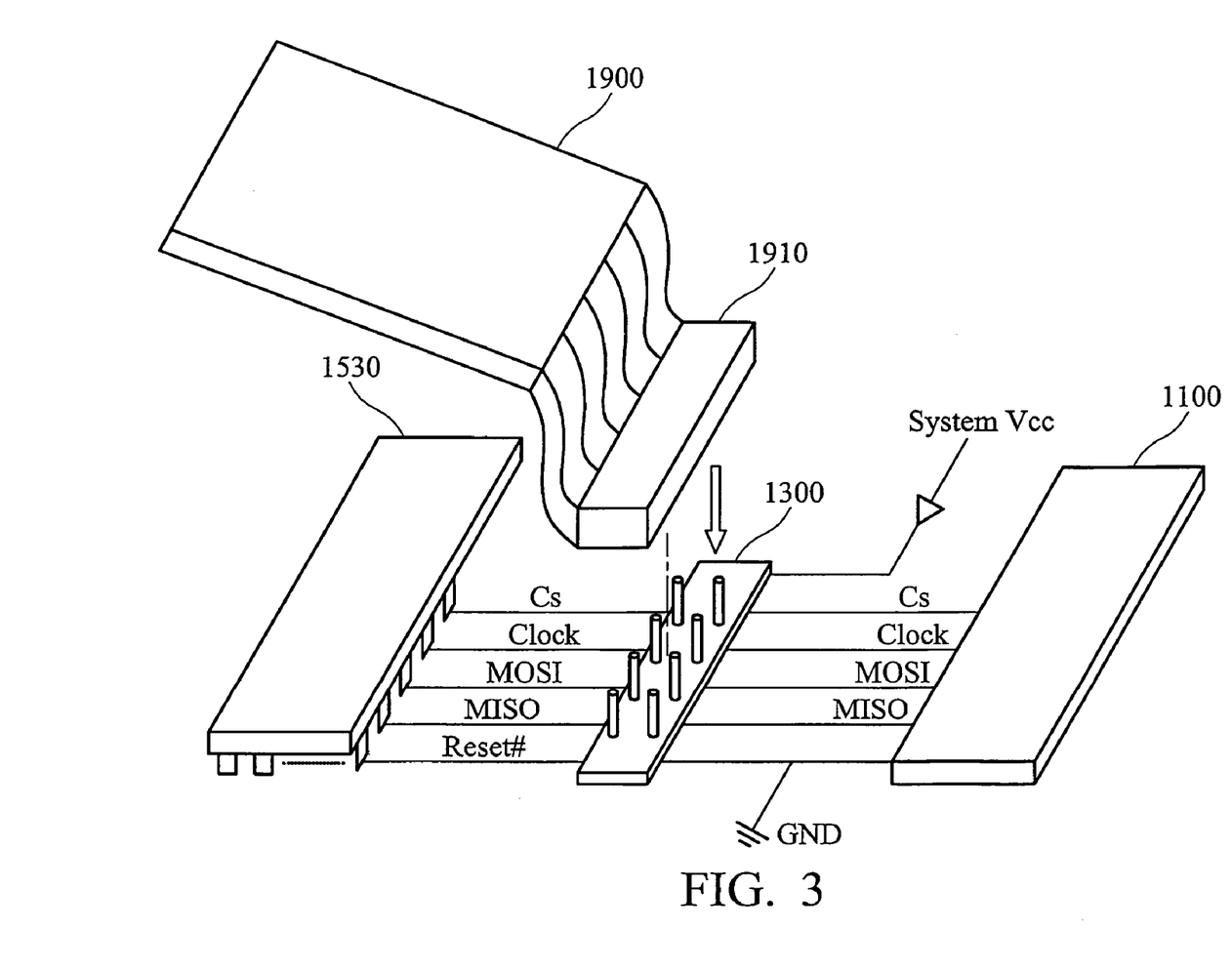
FIG. 3 is a diagram illustrating an external programmer plugging into a pin header via a connection port.

FIG. 3 is a diagram illustrates the external programmer 1900 plugging in the pin header 1300 by a connection port 1910. The pin header 1300 may comprise eight pins, where four pins are provided for transmission of SPI signals between the external programmer 1900 and the non-volatile memory 1100, and one pin is provided for assertion and de-assertion of a Reset# signal between the external programmer 1900 and the south-bridge 1530. After plugging the pin header 1300 into the connection port 1910, regardless of whether the full system is powered or not, the external programmer 1900 can retrieve data from the non-volatile memory 1100, or program BIOS in the non-volatile memory 1100 by SPI signals. Because the full system is powered, when retrieving data from the non-volatile memory 1100, or programming the BIOS in the non-volatile memory 1100, the external programmer 1900 asserts the Reset# signal. After completing the data retrieval, or BIOS programming, the external programmer 1900 de-asserts the Reset# signal. When detecting assertion of the Reset# signal from the external programmer 1900, input and output of buffers of the SPI controller 1531 (FIG. 2) for controlling the non-volatile memory 1100 are set to Hi-Impedance states, separating the SPI controller 1531 from the external programmer 1900. That is, the SPI controller 1531 will not be affected by the external programmer 1900 when retrieving data, or programming BIOS. When detecting de-assertion of the Reset# signal from the external programmer 1900, input and output of buffers of the SPI controller 1531 (FIG. 2) for controlling the non-volatile memory 1100 are set to normal states.

Figure 4:
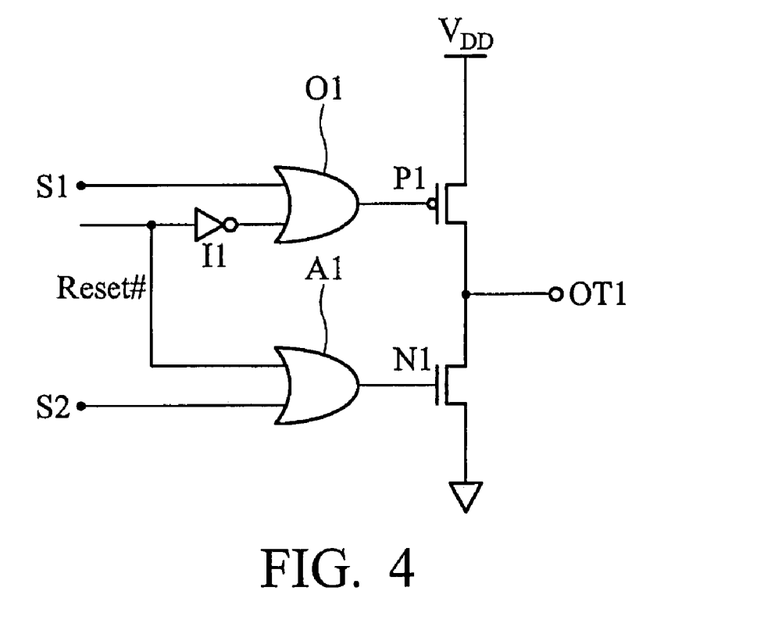
FIG. 4 is a diagram of an exemplary output buffer of a SPI controller.

FIG. 4 is a diagram of an exemplary output buffer of the SPI controller 1531, comprising an inverter I1, an OR gate O1, an AND gate A1, a P-MOS (P-channel metal-oxide-semiconductor) device P1, an N-MOS (N-channel metal-oxide-semiconductor) device N1, and an output terminal OT1. The output of the OR gate O1 is high regardless of an input signal S1 when the Reset# signal is asserted (i.e. pulling low) by the external programmer 1900 (FIG. 3). The output of the AND gate A1 is low regardless of an input signal S2 when the Reset# signal is asserted. The output terminal OT1 is set to high impedance when the output of the OR gate O1 is high, and the output of the AND gate A1 is low, separating the SPI controller 1531 (FIG. 3) from the external programmer 1900 (FIG. 3). Otherwise, the outputs of the OR gate O1 and the AND gate A1 respectively depends on the input signals S1 and S2 when the Reset# signal is de-asserted (i.e. being high). It is to be understood that, when the full system is powered off, the output terminal OT1 is in a high impedance state.

Figure 5:
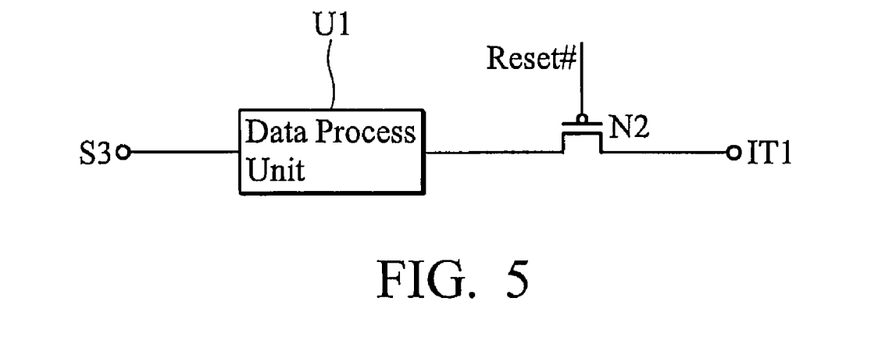
FIG. 5 is a diagram of an exemplary input buffer of a SPI controller.

FIG. 5 is a diagram of an exemplary input buffer of the SPI controller 1531, comprising a data process unit U1, and an N-MOS device N2. When a Reset# signal is asserted (i.e. pulled low) by the external programmer 1900 (FIG. 3), the N-MOS device N2 is disconnected (i.e. in a high impedance state), resulting in separation of the SPI controller 1531 from the external programmer 1900. When the Reset# signal is de-asserted (i.e. being high) by the external programmer 1900, data can input to the data process unit for further process. It is to be understood that, when the full system is powered off, the N-MOS device N2 is in a high impedance state.

Figure 6:
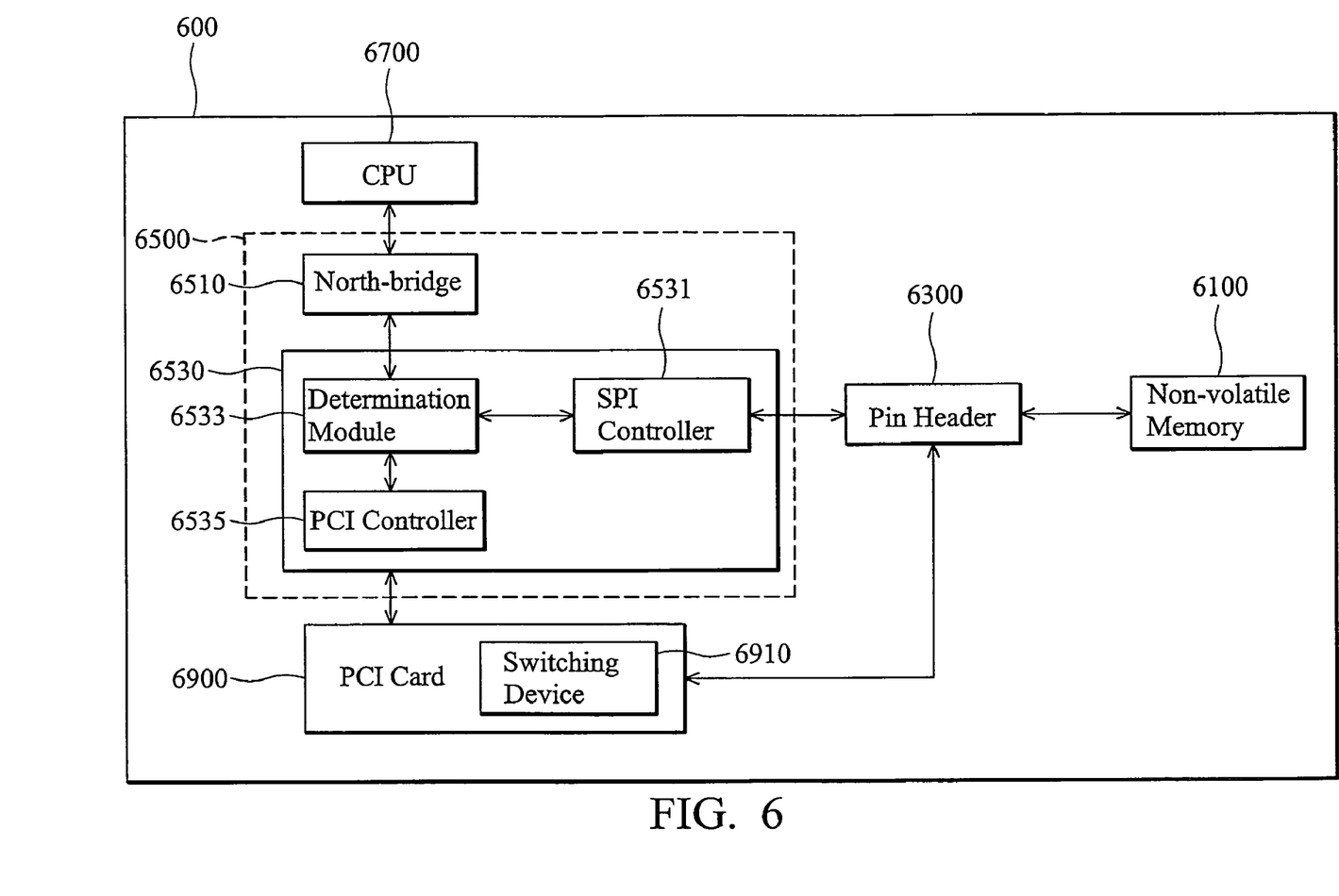
FIG. 6 is a diagram of a hardware environment of an embodiment of a system for BIOS management.

FIG. 6 is a diagram of a hardware environment of an embodiment of a system for BIOS management 600 comprising a non-volatile memory 6100, such as flash read only memory (ROM), a pin header 6300, a chipset 6500, a CPU 6700, and a peripheral component interconnect (PCI) card 6900. The non-volatile memory 6100, pin header 6300, chipset 6500, CPU 6700, and peripheral component interconnect (PCI) card 6900 are typically installed on a motherboard. The chipset 6500 typically comprises a north-bridge 6510 and a south-bridge 6530. The north-bridge 6510, a controller, typically handles communications between the CPU 6700, memory (not shown) or AGP (accelerated graphics port, not shown), and the south-bridge 6530. The south-bridge 6530 connects to the non-volatile memory 6100 by serial peripheral interface (SPI) bus. The south-bridge 6530 connects to the PCI card 6900 by PCI bus. The non-volatile memory 6100 stores BIOS comprising a set of routines enabling a computer to start an OS and to communicate with the various devices, such as disk drives, keyboard, monitor, printer, and communications ports. The south-bridge 6530 comprises a SPI controller 6531 and a PCI controller to respectively communicate with the nonvolatile memory 6100 and the PCI card 6900. The south-bridge 1530 further comprises a determination module 6533 to selectively acquire a BIOS from the non-volatile memory 6100 and the PCI card 6900. The PCI card 6900 stores a BIOS and comprises a switching device 6910.

Figure 7:
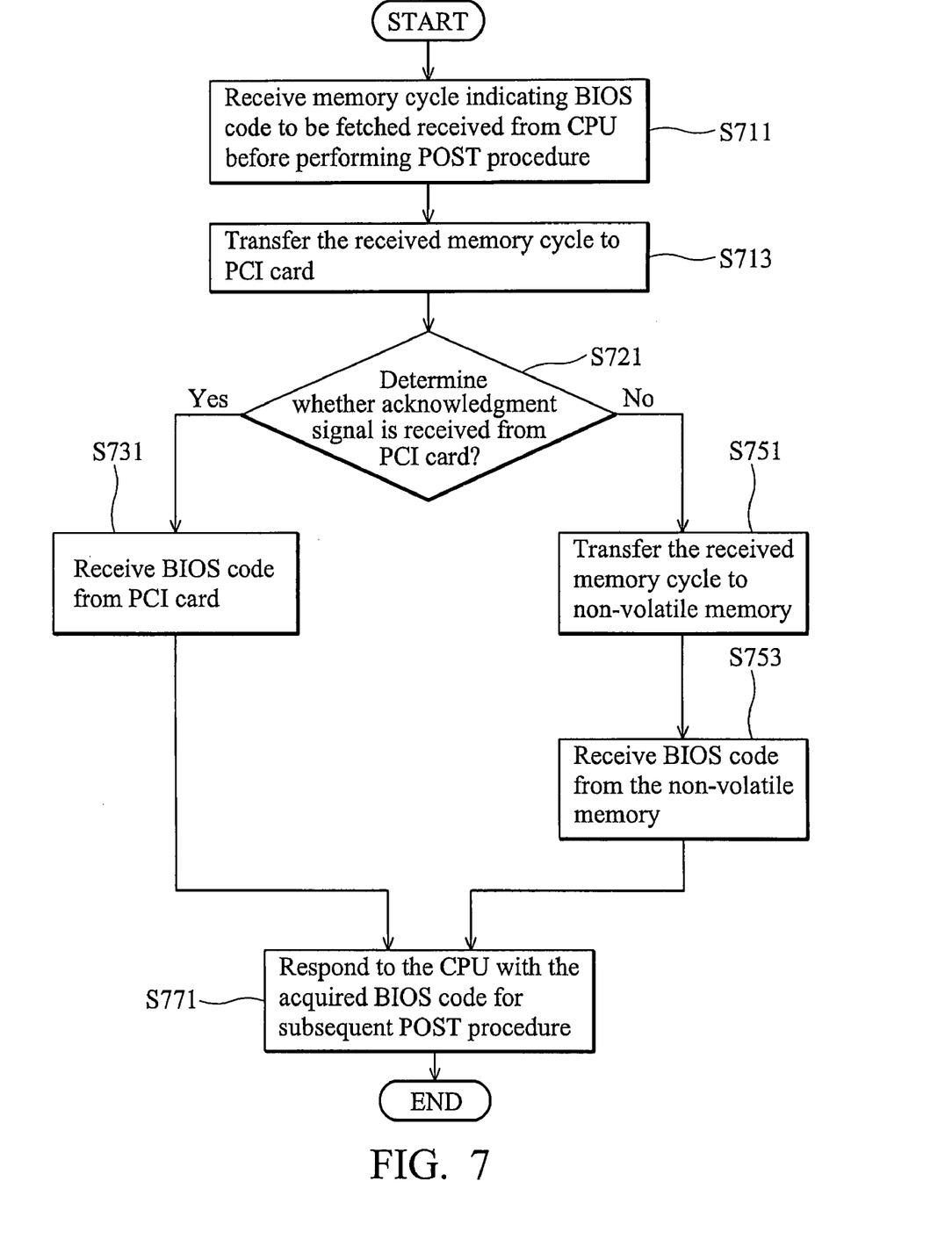
FIG. 7 is a flowchart illustrating an embodiment of a method for acquiring BIOS code.

FIG. 7 is a flowchart illustrating an embodiment of a method for acquiring BIOS code, performed by a determination module (e.g. 6533 of FIG. 6). In step S711, a memory cycle indicating BIOS code to be fetched, such as "0xFFFFFFFF", is received from a CPU (e.g. 6700 of FIG. 6) before performing a power-on self-test (POST) procedure. The POST procedure performs a series of built-in diagnostics via BIOS in a computer system when the computer system is first started. In step S713, the received memory cycle is transferred to a PCI card (e.g. 6900 of FIG. 6) via PCI bus. As the PCI card is present on the PCI bus, the PCI card ideally responds with an acknowledgment, acquires BIOS code thereof, and responds with the acquired BIOS code after receiving the memory cycle. In step S721, it is determined whether an acknowledgment signal is received from the PCI card. If so, the process proceeds to step S731 to acquire BIOS code from the PCI card, otherwise, to steps S751 and S753 to acquire BIOS code from a non-volatile memory (e.g. 6100 of FIG. 6). In step S731, BIOS code is received from the PCI card. In step S751, the received memory cycle is transferred to the non-volatile memory. In step S753, BIOS code is received from the non-volatile memory. In step S771, the acquired BIOS code is responded to the CPU for a subsequent POST procedure.

Figure 8:
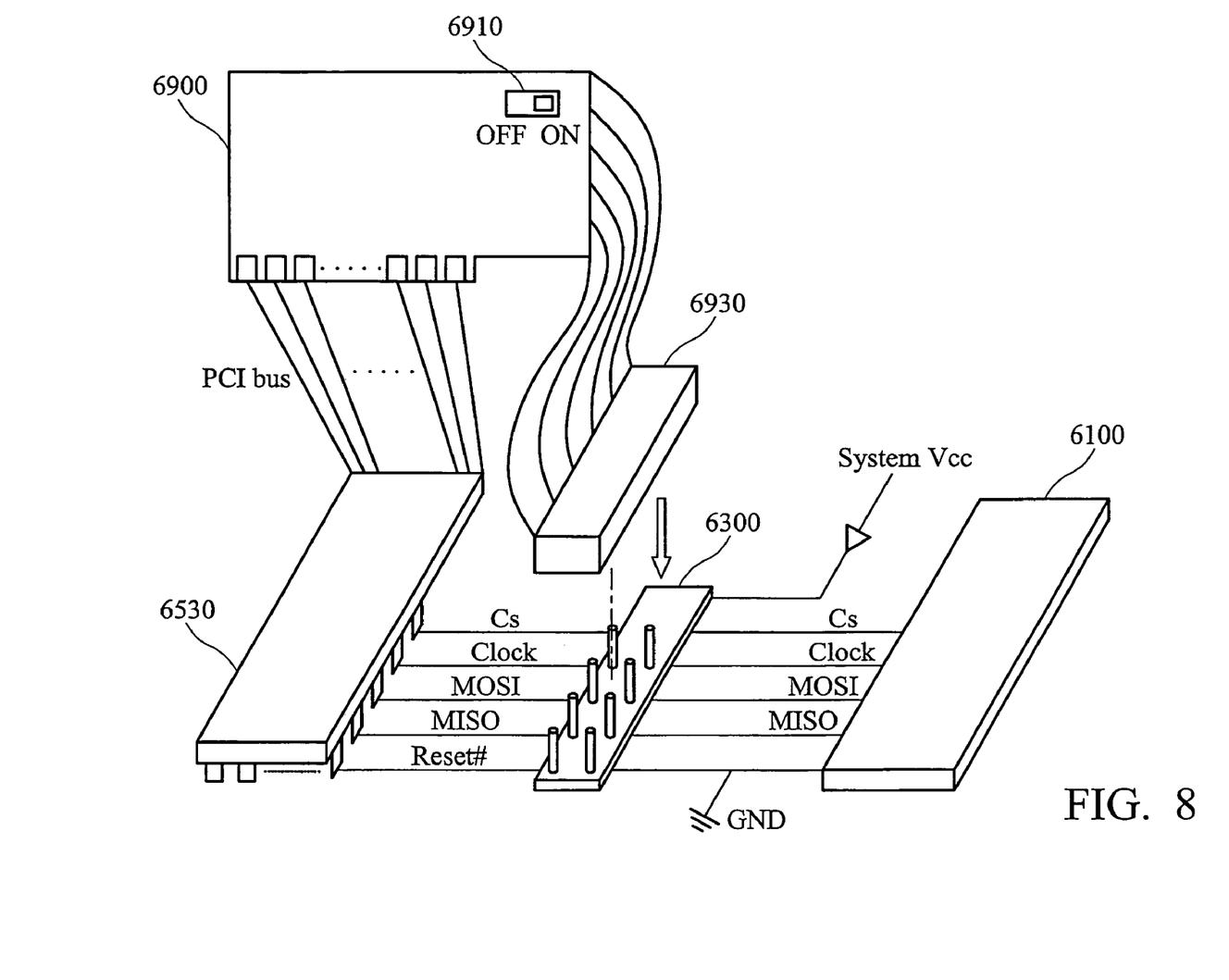
FIG. 8 is a diagram illustrates a PCI card plugged into a pin header via a connection port.

FIG. 8 is a diagram illustrating the PCI card 6900 plugged into the pin header 6300 via a connection port 6930. The pin header 6300 may comprise eight pins, where four pins are provided for transmission of SPI signals between the external programmer 6900 and the non-volatile memory 6100, and one pin is provided for assertion and de-assertion of a Reset# signal between the PCI card 6900 and the south-bridge 6530. After plugging into the pin header 6300 via the connection port 6930, regardless of whether the full system is powered or not, the PCI card 6900 can program BIOS in the non-volatile memory 6100 by the SPI signals. Because the full system is powered when the switching device 6910 is switched to an "ON" state, representing the start of a BIOS programming procedure, the PCI card 6900 asserts the Reset# signal. Subsequent to BIOS programming, the PCI card 6900 de-asserts the Reset# signal. When detecting assertion of the Reset# signal by the PCI card 6900, input and output of buffers of the SPI controller 6531 (FIG. 2) for controlling the non-volatile memory 6100 are set to Hi-Impedance states, separating the SPI controller 6531 from the external programmer 6900. That is, the PCI card 6900 does not affect the SPI controller 6531 during programming of the BIOS. When detecting de-assertion of the Reset# signal by the PCI card 6900, input and output of buffers of the SPI controller 6531 (FIG. 2) for controlling the non-volatile memory 1100 are set to normal states. The descriptions of FIGS. 4 and 5 provide details of the input and output buffers.

Figure 9:
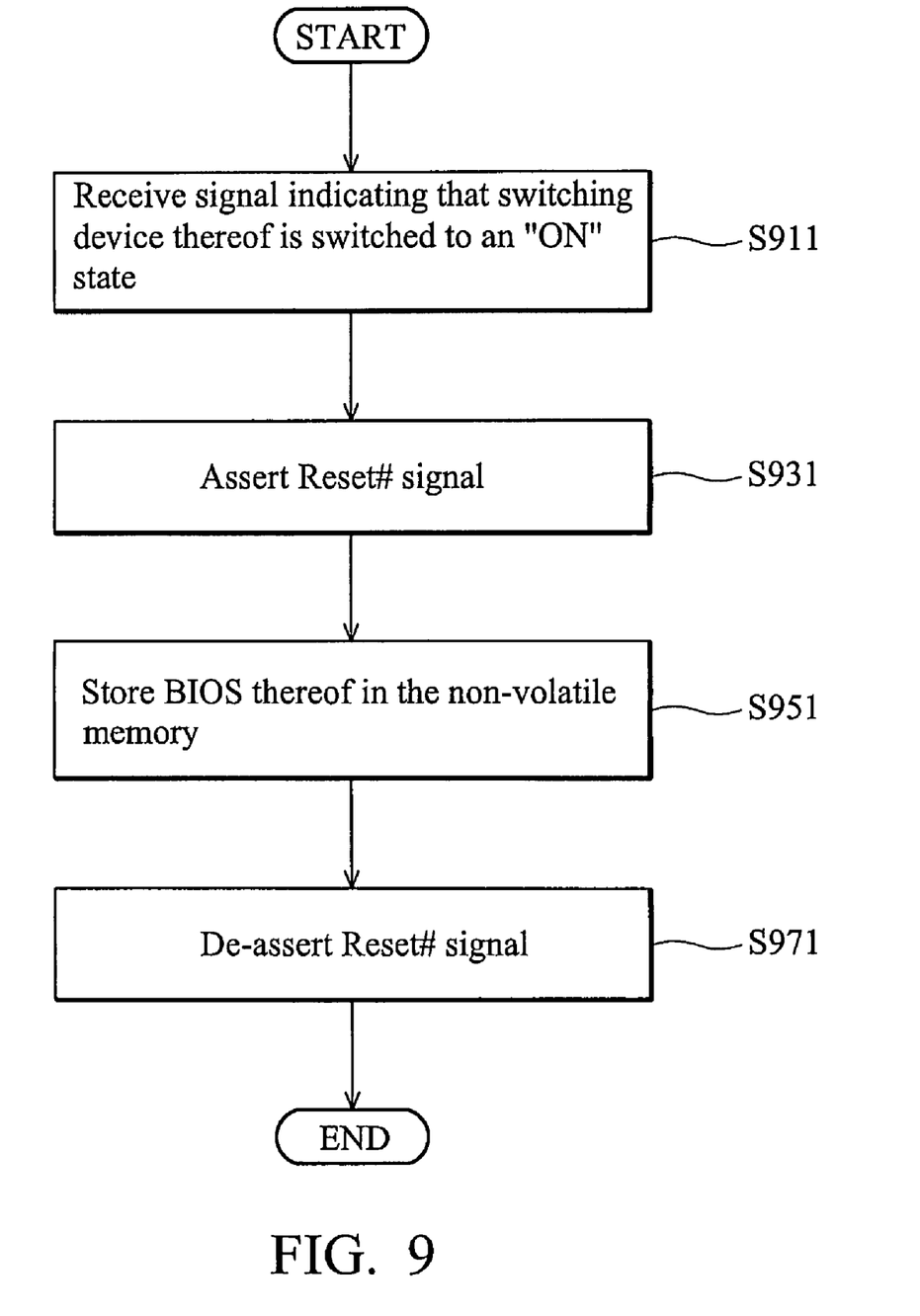
FIG. 9 is a flowchart illustrating an embodiment of a method for programming BIOS code in a non-volatile memory.

FIG. 9 is a flowchart illustrating an embodiment of a method for programming BIOS code in a non-volatile memory (e.g. 6100 of FIG. 8), performed by a PCI card (e.g. 6900 of FIG. 6). In step S911, a signal indicating that a switching device thereof (e.g. 6910) is switched to an "ON" state is received. It is to be understood that the switching device is typically manually switched. In step S931, a Reset# signal is asserted. In step S951, a BIOS thereof is stored (i.e. programmed) in the non-volatile memory. In step S971, after completing the BIOS programming, the Reset# signal is de-asserted.

Systems and methods, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer system and the like, the machine becomes an apparatus for practicing the invention. The disclosed methods and apparatuses may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in this technology can make various alterations and modifications without departing from the scope and spirit of the invention. Therefore, the scope of the invention shall be defined and protected by the following claims and their equivalents.

What is claimed is:

1. A computer system, comprising:
    a south-bridge comprising a controller including a buffer for communicating with an electronic device;
    a non-volatile memory storing a basic input output system (BIOS);
    a pin header connecting between the south-bridge and the non-volatile memory; and
    a conductive line directly connecting between a pin of the pin header and the south-bridge;
    wherein the buffer is set to a Hi-Impedance state to separate the controller from the electronic device when detecting that the electronic device plugs into the pin header and a Reset# signal is asserted via the conductive line, and the Reset# signal indicates a full system reset.

2. The system as claimed in claim 1 wherein the Reset# signal being asserted before programming the BIOS.

3. The system as claimed in claim 2 wherein the Reset# signal being de-asserted after completing programming of the BIOS.

4. The system as claimed in claim 1 wherein the electronic device comprises
    an external programmer and the external programmer plugs into the pin header via a connection port.

5. The system as claimed in claim 1 wherein the controller and the non-volatile memory are connected by serial peripheral interface (SPI) bus.

6. The system as claimed in claim 1 wherein the electronic device is a peripheral component interconnect (PCI) card and the
    PCI card including a switching device, and, when detecting that the switching device thereof is switched to a "ON" state, asserting the Reset# signal, and then programming the BIOS in the non-volatile memory.

7. The system as claimed in claim 6 wherein the PCI card de-asserts the Reset# signal after completing programming of the BIOS.

8. The system as claimed in claim 1 wherein the electronic device comprises a PCI card and
    the PCI card plugs into the pin header via a connection port.

9. The system as claimed in claim 8 wherein the PCI card and the south-bridge are connected via PCI bus.

10. A method for basic input output system (BIOS) management, performed by an electronic device electrically connected with a south-bridge via a pin header, comprising:
    asserting a Reset# signal to the south-bridge via a conductive line, wherein the conductive line is directly connected between a pin of the pin header and the south-bridge;
    setting a buffer of a controller of the south-bridge to a Hi-Impedance state to separate the controller from the electronic device if detecting that the electronic device plugs into the pin header and the Reset# signal is asserted; and
    programming a BIOS in a non-volatile memory after assertion of the Reset# signal;
    wherein the Reset# signal indicates a full system reset.

11. The method as claimed in claim 10 further comprising de-asserting the Reset# signal after completing programming of the BIOS.

12. The method as claimed in claim 10 wherein the buffer communicates with the non-volatile memory.

13. The method as claimed in claim 10 wherein the electronic device comprises an external programmer and the external programmer plugs into the pin header via a connection port.

14. The method as claimed in claim 10 wherein the controller and the non-volatile memory are connected by serial peripheral interface (SPI) bus.

15. The method as claimed in claim 10 wherein the electronic device is a peripheral component interconnect (PCI) card and the PCI card including a switching device, and, when detecting that the switching device thereof is switched to a "ON" state, asserting the Reset# signal, and then programming the BIOS in the non-volatile memory.

16. The method as claimed in claim 10 wherein the electronic device comprises a PCI card and the PCI card plugs into the pin header via a connection port.

17. The method as claimed in claim 16 wherein the PCI card and the south-bridge are connected via PCI bus.

* * * * *